United States Patent [19]

Hamanishi

[11] Patent Number: 4,468,097

[45] Date of Patent: Aug. 28, 1984

[54] FOUR-GROUP GREAT APERTURE RATIO ZOOM LENS

[75] Inventor: Yoshinari Hamanishi, Tokyo, Japan

[73] Assignee: Nippon Kogaku K.K., Tokyo, Japan

[21] Appl. No.: 421,421

[22] Filed: Sep. 22, 1982

[30] Foreign Application Priority Data

Sep. 28, 1981 [JP] Japan .................................. 56-153206

[51] Int. Cl.³ .......................... G02B 9/64; G02B 15/18
[52] U.S. Cl. ...................................................... 350/427
[58] Field of Search ......................................... 350/427

[56] References Cited

U.S. PATENT DOCUMENTS 4,223,981  9/1980  Mizutani et al. ...................... 350/423
4,380,377  4/1983  Sato et al. ............................ 350/427

*Primary Examiner*—John K. Corbin
*Assistant Examiner*—Rebecca D. Gass

*Attorney, Agent, or Firm*—Fitzpatrick, Cella, Harper & Scinto

[57] ABSTRACT

A great aperture ratio zoom lens has, in succession from the object side, a first lens group of positive refractive power having a focusing function, a second lens group of negative refractive power having a magnification changing function, a third lens group of positive refractive power having a correcting function for keeping the image plane at a predetermined position, and a fourth lens group of positive refractive power having an imaging function. The first to third lens groups from a substantially a focal magnification changing portion. The fourth lens group includes, in succession from the object side, a forward group comprising a positive meniscus lens component having its convex surface facing the object side, a positive lens components having its surface of sharper curvature facing the image side, and a biconcave lens component, and a rearward group having a negative lens component and a positive lens component. The zoom lens satisfies certain conditions.

9 Claims, 8 Drawing Figures

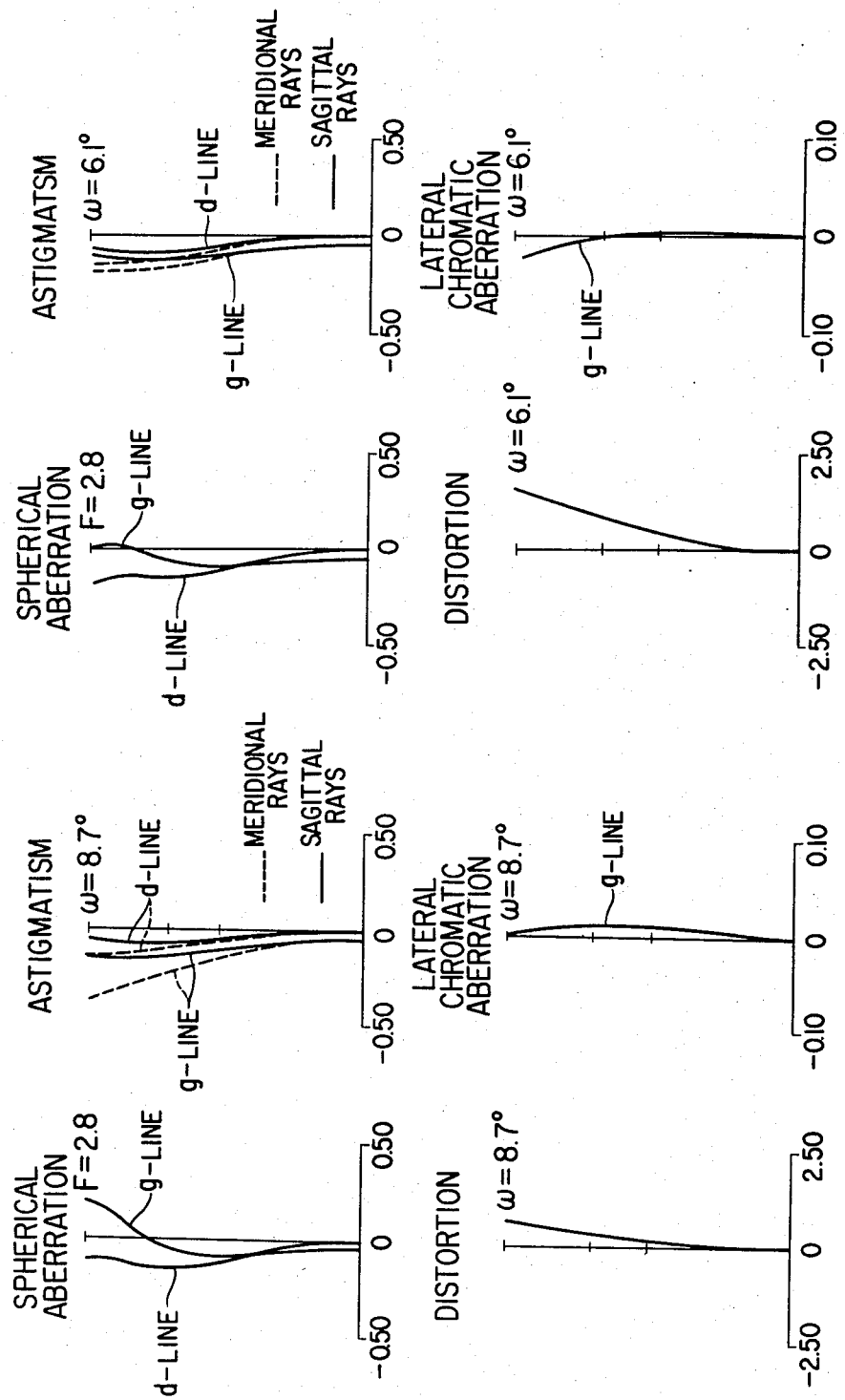

FOUR-GROUP GREAT APERTURE RATIO ZOOM LENS

BACKGROUND OF THE INVENTION

1. Field of the Invention

This invention relates to a four-group zoom lens, and more particularly to improvements in a zoom lens in which a first group as a focusing portion having a positive refractive power, a second group as a magnification changing portion having a negative refractive power, a third group as a compensator portion having a positive refractive power, and a fourth group as a relay lens portion having a positive refractive power and the three groups adjacent to the object side form a substantially afocal system.

2. Description of the Prior Art

Nowadays, the performance of zoom lenses has been considerably improved, but there are not so many zoom lenses which are bright. Many of the conventional zoom lenses have been dark as compared with fixed focal length lenses and have been disadvantageous in focusing because viewfinder image is correspondingly dark. Also, when it has been necessary to effect photography with a high-speed shutter, the darkness of the zoom lenses has resulted in many inconveniences and it has often been the case that special shutter chances are lost. To overcome these problems, it is desired to provide zoom lenses with a great aperture ratio, but great aperture ratio zoom lenses are frequently used during opening and are therefore required to have a high performance even during full aperture.

Generally, as an optical system is made brighter, it becomes difficult to correct annular spherical aberration, coma and astigmatism and a number of lenses must be used for the correction of these aberrations, and this has necessarily led to a bulky and complicated construction.

SUMMARY OF THE INVENTION

It is therefore an object of the present invention to provide a four-group zoom lens which is simple in construction and yet has a great aperture ratio and moreover has an excellent imaging performance even during opening.

The invention will become fully apparent from the following detailed description thereof taken in conjunction with the accompanying drawings.

BRIEF DESCRIPTION OF THE DRAWINGS

FIGS. 2 to 4 show the various aberrations at f=80, f=140 and f=200.

FIGS. 6 to 8 show the various aberrations at f=80, f=140 and f=200.

DESCRIPTION OF THE PREFERRED EMBODIMENTS

Figure 1:
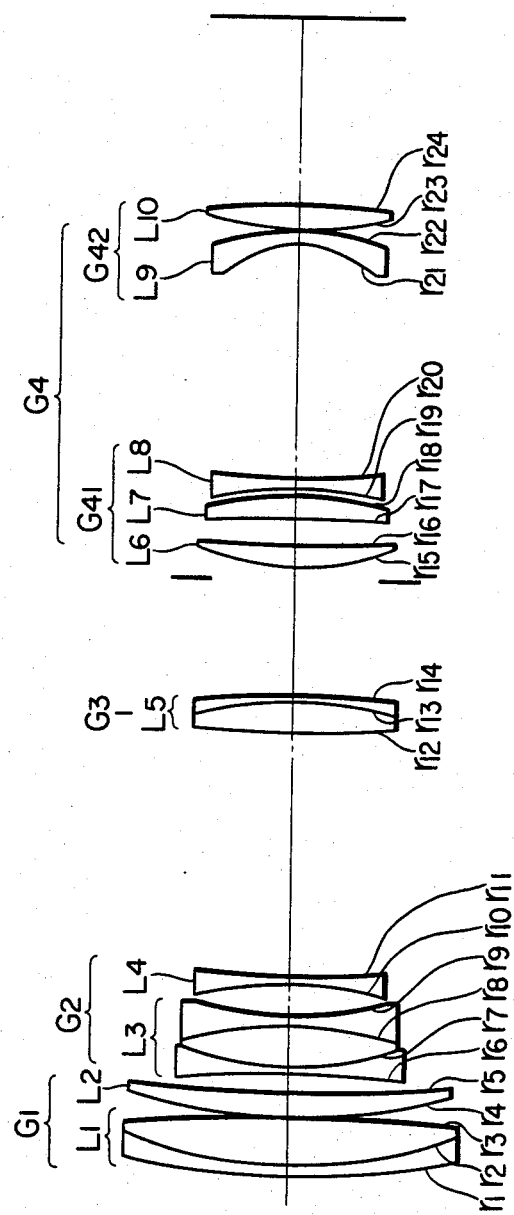
FIG. 1 shows a lens cross section of a first embodiment of the present invention.

The present invention has contrived the construction of particularly a fourth group as a relay lens system in the conventional four-group zoom lens. That is, the zoom lens of the present invention has, in succession from the object side, a first lens group of positive refractive power having a focusing function, a second lens group of negative refractive power having a magnification changing function, a third lens group of positive refractive power having a correcting function for keeping the image plane at a predetermined position, and a fourth lens group of positive refractive power having an imaging function, the first to third lens groups constituting a substantially afocal magnification changing portion, the fourth lens group including, in succession from the object side, a forward group comprising a positive meniscus lens component having its convex surface facing the object side, a positive meniscus lens component having its surface of sharper curvature facing the image side, and a biconcave lens component, and a rearward group having a negative lens component and a positive lens component, said zoom lens satisfying the following conditions:

$$-0.3 < Nb - Na < 0.3 \tag{1}$$

$$-3.0 < qa < -0.5 \tag{2}$$

$$-0.5 < qb < 1.0 \tag{3}$$

$$0.8 < f_{41}/f_4 < 1.2 \tag{4}$$

where Na represents the refractive index of the positive meniscus lens component in the forward group which has its surface of sharper curvature facing the image side, qa represents the shape factor of the same positive meniscus lens component, Nb represents the refractive index of the biconcave lens component, qb represents the shape factor of the same biconcave lens component, $f_4$ represents the composite focal length of the fourth lens group, and $f_{41}$ represents the composite focal length of the forward group (the shape factor q is defined by $q = (r_t + r_s)/(r_t - r_s)$ when the radius of curvature of the lens surface of said lens which is adjacent to the object side is $r_s$ and the radius of curvature of the lens surface of said lens which is adjacent to the image side is $r_t$).

The above conditions will hereinafter be described in detail.

Condition (1) prescribes a proper balance of annular spherical aberration and Petzval sum. If the upper limit of this condition is exceeded, high order spherical aberration excessive in the negative sense will occur and Petzval sum will become too positive and the sagittal image plane will be bent excessively in the negative sense. If the lower limit of this condition is exceeded, high order spherical aberration excessive in the positive sense will occur and remarkable annular spherical aberration will occur and Petzval sum will become excessively negative and thus, it will be difficult to maintain a sufficient imaging function during opening.

Condition (2) prescribes a proper balance of spherical aberration. If the upper limit of this condition is exceeded, spherical aberration will become excessively positive and, if the lower limit of this condition is exceeded, spherical aberration will become excessively negative, and this is undesirable.

Condition (3) prescribes a suitable balance of spherical aberration and coma. If the upper limit of this condition is exceeded, excessively positive spherical aberration will occur and excessive extrorse coma will occur, and this is undesirable. If the lower limit of this condition is exceeded, negatively excessive spherical aberration and introversive coma will occur, and this is undesirable.

Figure 5:
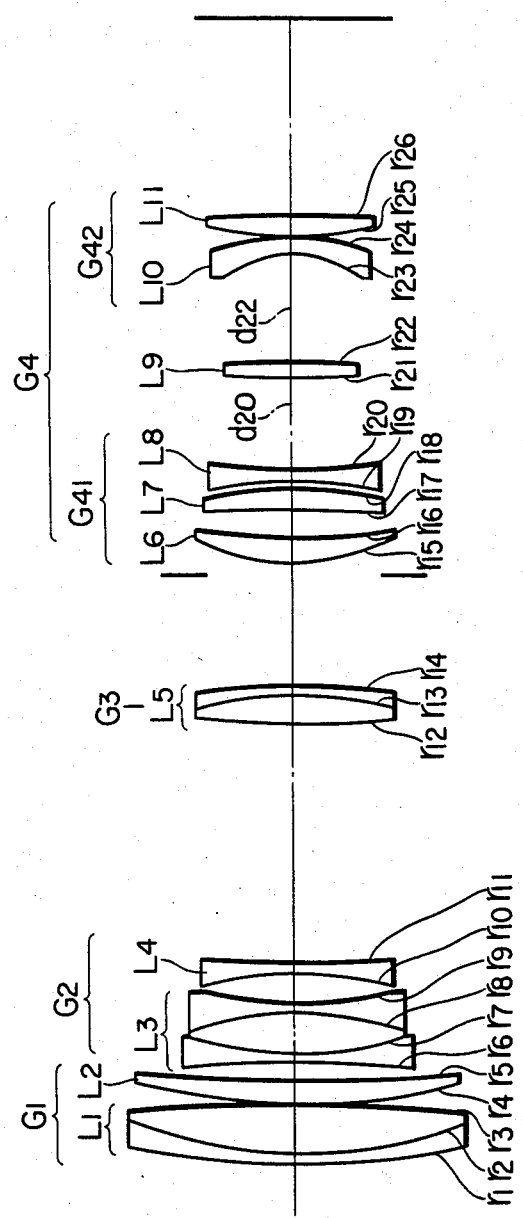
FIG. 5 shows a lens cross section of a second embodiment of the present invention.

If the upper limit of condition (4) is exceeded, the relay lens will become too long and, if the lower limit of this condition is exceeded, it will become difficult to correct spherical aberration and coma and the diameter of the aperture stop will become larger, and this is undesirable. A first embodiment is a great aperture ratio zoom lens having a focal length f=80–200 mm and F-number 2.8. This embodiment is typical of the present invention and a lens cross section thereof is shown in FIG. 1. The present embodiment comprises ten components and fourteen lenses. The fourth group $G_4$ as the relay lens comprises, in succession from the object side, a positive meniscus lens $L_6$ having its convex surface facing the object side, a positive meniscus lens $L_7$ having its concave facing the object side, a biconcave lens $L_8$ (these lenses together constitute a forward group $G_{41}$), a negative meniscus lens $L_9$ having its concave surface facing the object side, and a biconvex lens $L_{10}$ (these lenses together constitute a rearward group $G_{42}$). The lenses $L_7$ and $L_8$ having a composite negative refractive power, and by making these into positive and negative mutually separated constructions, annular spherical aberration and curvature of image field are reduced. A second embodiment also is a great aperture ratio zoom lens having a focal length f=80–200 mm and F-number 2.8. A lens cross section of this embodiment is shown in FIG. 5. The second embodiment has features similar to those of the first embodiment, and in this embodiment, a biconvex lens $L_9$ is added between the forward group $G_{41}$ and the rearward group $G_{42}$ of the fourth group $G_4$ as the relay lens of the first embodiment, whereby the effective diameter of the last lens $L_{11}$ is made smaller. This biconvex lens $L_9$ serves also as a fixed diaphragm. The shape factor qc of this biconvex lens $L_9$ should desirably satisfy the following condition:

$$-0.5 < qc < 0.5$$

If the upper limit of this condition is exceeded, spherical aberration will become positively excessive and astigmatism will become negatively excessive, and this is undesirable. If the lower limit of this condition is exceeded, spherical aberration and astigmatism will become excessive in the opposite senses, and this is undesirable. Further, it is desirable that the condition that $0.3 < d_{20}/d_{22} < 2.0$ be satisfied, where $d_{20}$ is the distance between the biconvex lens $L_9$ and the forward group, and $d_{22}$ is the distance between the biconvex lens $L_9$ and the rearward group. If the upper limit of this condition is exceeded, curvature of image field will remarkably occur on the wide angle side, and this is undesirable. If the lower limit of this condition is exceeded, it will become difficult to efficiently make only the effective diameter of the last lens $L_{11}$ small.

The numerical data of each embodiment will be shown below. In the tables below, $r_1, r_2, r_3, \ldots$ represent the radii of curvature of the successive lens surfaces from the object side, $d_1, d_2, d_3, \ldots$ represent the center thicknesses and air spaces of the successive lenses, $n_1, n_2, n_3, \ldots$ and $\nu_1, \nu_2, \nu_3, \ldots$ represent refractive indices and Abbe numbers, respectively, of the successive lenses.

TABLE 1

(First Embodiment)
f = 80~200   F-number 2.8

| | | | | | |
|---|---|---|---|---|---|
| $r_1 = 164.0$ | $d_1 = 2.7$ | $n_1 = 1.75520$ | $\nu_1 = 27.6$ | } $L_1$ | |
| $r_2 = 105.11$ | $d_2 = 10.5$ | $n_2 = 1.50032$ | $\nu_2 = 82.3$ | | } $G_1$ |
| $r_3 = -425.427$ | $d_3 = 0.2$ | | | | |
| $r_4 = 160.0$ | $d_4 = 5.0$ | $n_3 = 1.50032$ | $\nu_3 = 82.3$ | $L_2$ | |
| $r_5 = 405.897$ | $d_5 = $ variable | | | | |
| $r_6 = -300.0$ | $d_6 = 1.6$ | $n_4 = 1.78797$ | $\nu_4 = 47.5$ | } $L_3$ | |
| $r_7 = 80.9$ | $d_7 = 9.0$ | $n_5 = 1.75520$ | $\nu_5 = 27.6$ | | |
| $r_8 = -66.99$ | $d_8 = 1.45$ | $n_6 = 1.58144$ | $\nu_6 = 40.8$ | | } $G_2$ |
| $r_9 = 90.0$ | $d_9 = 6.6$ | | | | |
| $r_{10} = -80.0$ | $d_{10} = 1.8$ | $n_7 = 1.58913$ | $\nu_7 = 61.2$ | $L_4$ | |
| $r_{11} = 346.871$ | $d_{11} = $ variable | | | | |
| $r_{12} = 200.0$ | $d_{12} = 7.0$ | $n_8 = 1.67025$ | $\nu_8 = 57.6$ | } $L_5$ | $G_3$ |
| $r_{13} = -65.33$ | $d_{13} = 1.45$ | $n_9 = 1.80518$ | $\nu_9 = 25.4$ | | |
| $r_{14} = -149.632$ | $d_{14} = $ variable | | | | |
| $r_{15} = 45.478$ | $d_{15} = 5.5$ | $n_{10} = 1.78797$ | $\nu_{10} = 47.5$ | $L_6$ | |
| $r_{16} = 228.650$ | $d_{16} = 6.0$ | | | | |
| $r_{17} = -369.2$ | $d_{17} = 4.5$ | $n_{11} = 1.80411$ | $\nu_{11} = 46.4$ | $L_7$ | } $G_{41}$ |
| $r_{18} = -89.55$ | $d_{18} = 1.5$ | | | | |
| $r_{19} = -81.538$ | $d_{19} = 2.0$ | $n_{12} = 1.75520$ | $\nu_{12} = 27.6$ | $L_8$ | |
| $r_{20} = 160.5$ | $d_{20} = 49.6$ | | | | } $G_4$ |
| $r_{21} = -24.2$ | $d_{21} = 2.4$ | $n_{13} = 1.56965$ | $\nu_{13} = 49.4$ | $L_9$ | |
| $r_{22} = -46.670$ | $d_{22} = 0.2$ | | | | } $G_{42}$ |
| $r_{23} = 85.00$ | $d_{23} = 5.0$ | $n_{14} = 1.70154$ | $\nu_{14} = 41.0$ | $L_{10}$ | |
| $r_{24} = -182.275$ | | | | | |

Back focal length $B_f = 39.497$
| f | 80 | 140 | 200 |
|---|---|---|---|
| $d_5$ | 4.2245 | 51.0442 | 69.772 |
| $d_{11}$ | 50.4264 | 25.6447 | 0.863 |
| $d_{14}$ | 25.317 | 3.279 | 9.3328 |

$f_4 = 114.874$
$f_{41} = 117.458$
$qa = q_7 = -1.64$
$qb = q_8 = 0.326$

TABLE 2

(Second Embodiment)
f = 80~200    F-number 2.8

| | | | | | |
|---|---|---|---|---|---|
| $r_1 = 164.0$ | $d_1 = 2.7$ | $n_1 = 1.75520$ | $\nu_1 = 27.6$ | } $L_1$ | |
| $r_2 = 105.11$ | $d_2 = 10.5$ | $n_2 = 1.50032$ | $\nu_2 = 82.3$ | | } $G_1$ |
| $r_3 = -425.427$ | $d_3 = 0.2$ | | | | |
| $r_4 = 160.0$ | $d_4 = 5.0$ | $n_3 = 1.50032$ | $\nu_3 = 82.3$ | $L_2$ | |
| $r_5 = 405.897$ | $d_5$ = variable | | | | |
| $r_6 = -300.0$ | $d_6 = 1.6$ | $n_4 = 1.78797$ | $\nu_4 = 47.5$ | } $L_3$ | |
| $r_7 = 80.90$ | $d_7 = 9.0$ | $n_5 = 1.75520$ | $\nu_5 = 27.6$ | | |
| $r_8 = -66.99$ | $d_8 = 1.45$ | $n_6 = 1.58144$ | $\nu_6 = 40.8$ | | } $G_2$ |
| $r_9 = 90.0$ | $d_9 = 6.6$ | | | | |
| $r_{10} = -80.0$ | $d_{10} = 1.8$ | $n_7 = 1.58913$ | $\nu_7 = 61.2$ | $L_4$ | |
| $r_{11} = 346.871$ | $d$ = variable | | | | |
| $r_{12} = 200.0$ | $d_{12} = 7.0$ | $n_8 = 1.67025$ | $\nu_8 = 57.6$ | } $L_5$ | $G_3$ |
| $r_{13} = -65.0$ | $d_{13} = 1.45$ | $n_9 = 1.80518$ | $\nu_9 = 25.4$ | | |
| $r_{14} = -149.342$ | $d_{14}$ = variable | | | | |
| $r_{15} = 41.2$ | $d_{15} = 6.0$ | $n_{10} = 1.78797$ | $\nu_{10} = 47.5$ | $L_6$ | |
| $r_{16} = 158.55$ | $d_{16} = 6.0$ | | | | |
| $r_{17} = -206.77$ | $d_{17} = 4.5$ | $n_{11} = 1.78797$ | $\nu_{11} = 47.5$ | $L_7$ | } $G_{41}$ |
| $r_{18} = -80.9$ | $d_{18} = 1.5$ | | | | |
| $r_{19} = -78.547$ | $d_{19} = 2.0$ | $n_{12} = 1.75520$ | $\nu_{12} = 27.6$ | $L_8$ | |
| $r_{20} = 147.06$ | $d_{20} = 19.0$ | | | | } $G_4$ |
| $r_{21} = 260.0$ | $d_{21} = 3.5$ | $n_{13} = 1.63854$ | $\nu_{13} = 55.5$ | $L_9$ | |
| $r_{22} = -299.3$ | $d_{22} = 22.7$ | | | | |
| $r_{23} = -24.38$ | $d_{23} = 3.0$ | $n_{14} = 1.7130$ | $\nu_{14} = 54.0$ | $L_{10}$ | |
| $r_{24} = -48.971$ | $d_{24} = 0.2$ | | | | } $G_{42}$ |
| $r_{25} = 77.0$ | $d_{25} = 4.5$ | $n_{15} = 1.61293$ | $\nu_{15} = 37.0$ | $L_{11}$ | |
| $r_{26} = -295.287$ | | | | | |

Back focal length $B_f = 40.639$

| f | 80 | 140 | 200 |
|---|---|---|---|
| $d_5$ | 4.2245 | 51.0442 | 69.772 |
| $d_{11}$ | 50.425 | 25.6435 | 0.8618 |
| $d_{14}$ | 25.318 | 3.280 | 9.334 |

$f_4 = 114.874$
$f_{41} = 131.212$
$qa = q_7 = -2.285$
$qb = q_8 = 0.304$
$qc = q_9 = 0.07$

Figure 2:
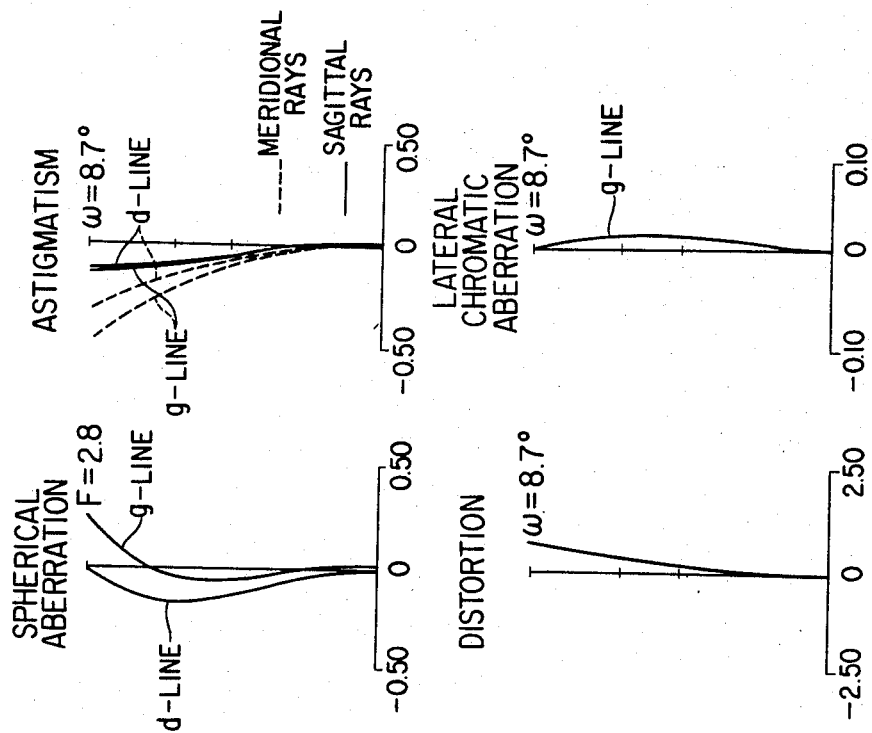
Figure 3:
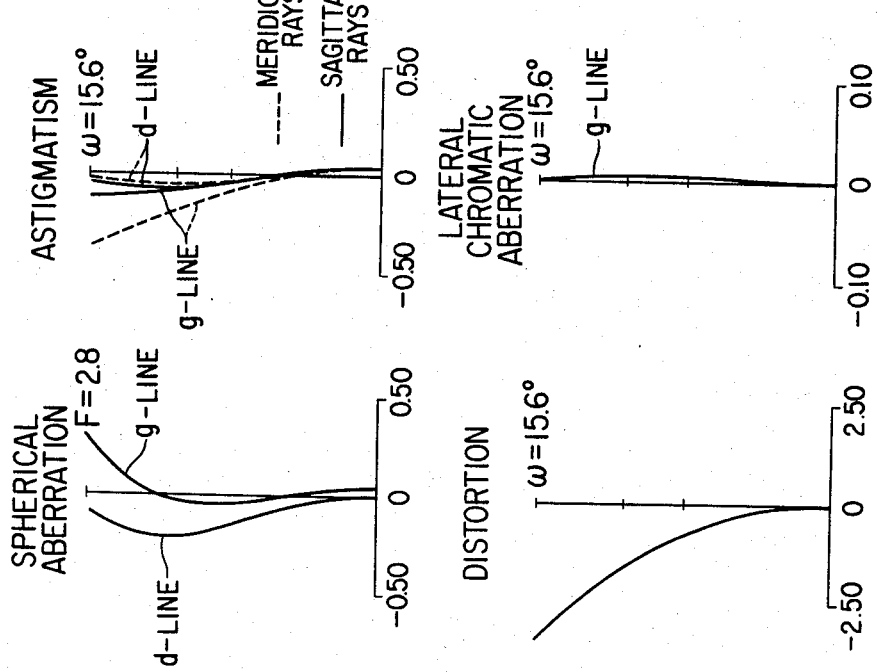
Figures 4, 6:
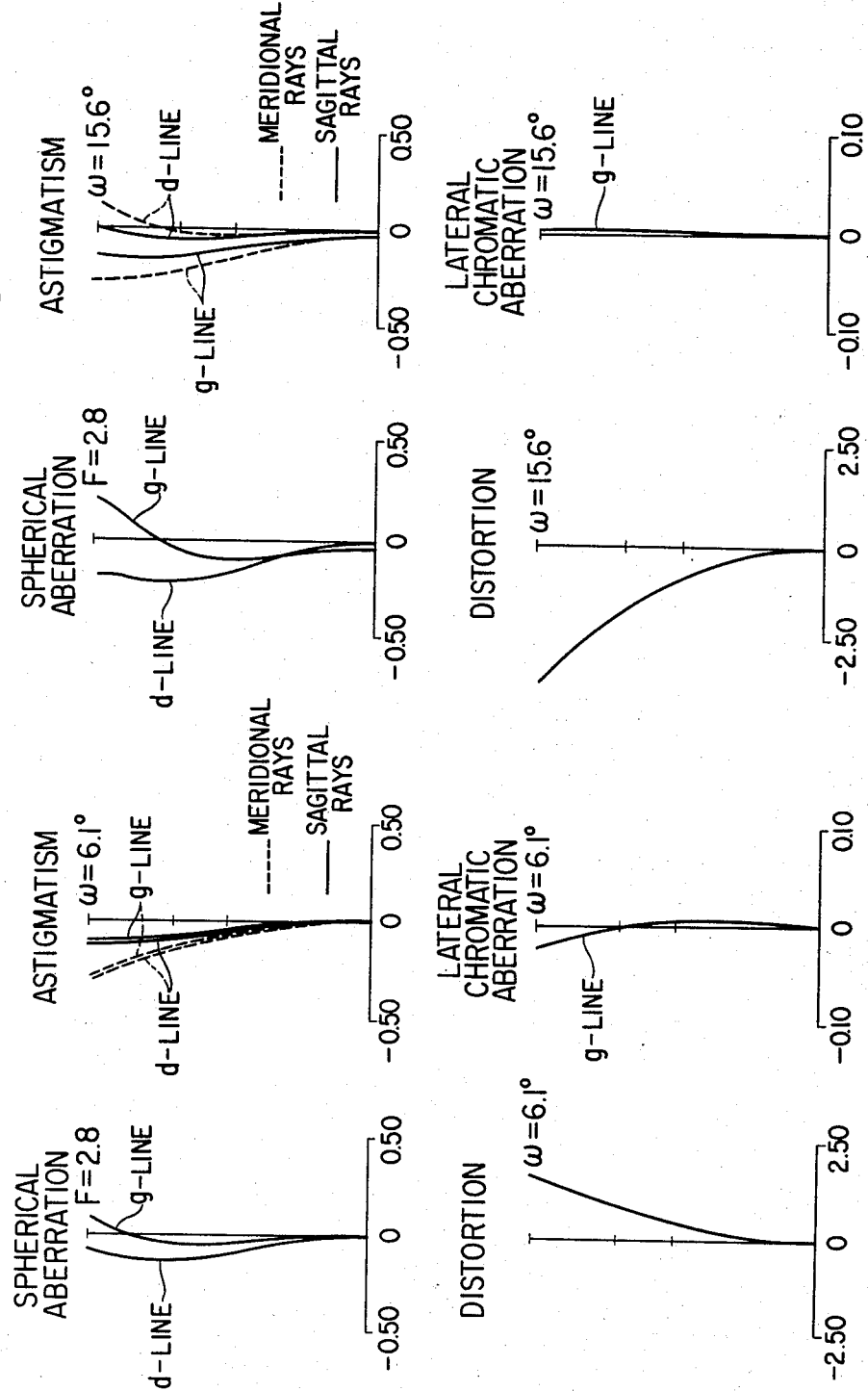

The various aberrations in the first embodiment are shown in FIGS. 2-4. FIG. 2 shows the aberrations at f=80, FIG. 3 shows the aberrations at f=140, and FIG. 4 shows the aberrations at f=200. In these figures, various aberrations are shown for d-line ($\lambda$=587.6 nm) and g-line ($\lambda$=435.8 nm) as the standard wavelengths. The various aberrations in the second embodiment are shown in FIGS. 6-8. FIG. 6 shows the aberrations at f=80, FIG. 7 shows the aberrations at f=140, and FIG. 8 shows the aberrations at f=200.

From these figures, it is apparent that in both embodiments, the various aberrations are well corrected in spite of the brightness of F-number 2.8 and that both embodiments have a sufficient imaging performance even during full aperture. Moreover, the fourth group as the relay lens system is of a simple construction which comprises five or six lenses, and this endorses that the present invention is effective.

I claim:

1. A great aperture ratio zoom lens having, in succession from the object side, a first lens group of positive refractive power having a focusing function, a second lens group of negative refractive power having a magnification changing function, a third lens group of positive refractive power having a correcting function for keeping the image plane at a predetermined position, and a fourth lens group of positive refractive power having an imaging function, said first to third lens groups forming a substantially afocal magnification changing portion, characterized in that said fourth lens group includes, in succession from the object side, a forward group comprising a positive meniscus lens component having its convex surface facing the object side, a positive lens component having its surface of sharper curvature facing the image side, and a biconcave lens component, and a rearward group having a negative lens component and a positive lens component, and said zoom lens satisfies the following conditions:

$$-0.3 < Nb - Na < 0.3 \quad (1)$$

$$-3.0 < qa < -0.5 \quad (2)$$

$$-0.5 < qb < 1.0 \quad (3)$$

$$0.8 < f_{41}/f_4 < 1.2 \quad (4)$$

where Na represents the refractive index of the positive lens component in said forward group which has its surface of sharper curvature facing the image side, qa represents the shape factor of said positive meniscus lens component, Nb represents the refractive index of said biconcave lens component, qb represents the shape factor of said biconcave lens component, $f_4$ represents the composite focal length of said fourth lens group, and $f_{41}$ represents the composite focal length of said forward group (the shape factor q is defined by $q=(r_t+r_s)/(r_t-r_s)$ when the radius of curvature of the lens surface of said lens which is adjacent to the object side is $r_s$ and the radius of curvature of the lens surface of said lens which is adjacent to the image side is $r_t$).

2. The zoom lens according to claim 1, wherein numerical data are as follows:

| $f = 80 \sim 200$ | | $N =$ number 2.8 | | | |
|---|---|---|---|---|---|
| $r_1 = 164.0$ | $d_1 = 2.7$ | $n_1 = 1.75520$ | $\nu_1 = 27.6$ | } $L_1$ | } |
| $r_2 = 105.11$ | $d_2 = 10.5$ | $n_2 = 1.50032$ | $\nu_2 = 82.3$ | | } $G_1$ |
| $r_3 = -425.427$ | $d_3 = 0.2$ | | | | |
| $r_4 = 160.0$ | $d_4 = 5.0$ | $n_3 = 1.50032$ | $\nu_3 = 82.3$ | $L_2$ | |
| $r_5 = 405.897$ | $d_5 =$ variable | | | | |
| $r_6 = -300.0$ | $d_6 = 1.6$ | $n_4 = 1.78797$ | $\nu_4 = 47.5$ | } $L_3$ | |
| $r_7 = 80.9$ | $d_7 = 9.0$ | $n_5 = 1.75520$ | $\nu_5 = 27.6$ | | |
| $r_8 = -66.99$ | $d_8 = 1.45$ | $n_6 = 1.58144$ | $\nu_6 = 40.8$ | | } $G_2$ |
| $r_9 = 90.0$ | $d_9 = 6.6$ | | | | |
| $r_{10} = -80.0$ | $d_{10} = 1.8$ | $n_7 = 1.58913$ | $\nu_7 = 61.2$ | $L_4$ | |
| $r_{11} = 346.871$ | $d_{11} =$ variable | | | | |
| $r_{12} = 200.0$ | $d_{12} = 7.0$ | $n_8 = 1.67025$ | $\nu_8 = 57.6$ | } $L_5$ | $G_3$ |
| $r_{13} = -65.33$ | $d_{13} = 1.45$ | $n_9 = 1.80518$ | $\nu_9 = 25.4$ | | |
| $r_{14} = -149.632$ | $d_{14} =$ variable | | | | |
| $r_{15} = 45.478$ | $d_{15} = 5.5$ | $n_{10} = 1.78797$ | $\nu_{10} = 47.5$ | $L_6$ } | |
| $r_{16} = 228.650$ | $d_{16} = 6.0$ | | | | |
| $r_{17} = -369.2$ | $d_{17} = 4.5$ | $n_{11} = 1.80411$ | $\nu_{11} = 46.4$ | $L_7$ } $G_{41}$ | |
| $r_{18} = -89.55$ | $d_{18} = 1.5$ | | | | |
| $r_{19} = -81.538$ | $d_{19} = 2.0$ | $n_{12} = 1.75520$ | $\nu_{12} = 27.6$ | $L_8$ } | } $G_4$ |
| $r_{20} = 160.5$ | $d_{20} = 49.6$ | | | | |
| $r_{21} = -24.2$ | $d_{21} = 2.4$ | $n_{13} = 1.56965$ | $\nu_{13} = 49.4$ | $L_9$ } $G_{42}$ | |
| $r_{22} = -46.670$ | $d_{22} = 0.2$ | | | | |
| $r_{23} = 85.00$ | $d_{23} = 5.0$ | $n_{14} = 1.70154$ | $\nu_{14} = 41.0$ | $L_{10}$ | |
| $r_{24} = -182.275$ | | | | | |

| Back focal length $B_f = 39.497$ | | | |
|---|---|---|---|
| f | 80 | 140 | 200 |
| $d_5$ | 4.2245 | 51.0442 | 69.772 |
| $d_{11}$ | 50.4264 | 25.6447 | 0.863 |
| $d_{14}$ | 25.317 | 3.279 | 9.3328 |

$f_4 = 114.874$
$f_{41} = 117.458$
$qa = q_7 = -1.64$
$qb = q_8 = 0.326$ where $r_1, r_2, r_3, \ldots$ represent the radii of curvature of the successive lens surfaces from the object side, $d_1, d_2, d_3, \ldots$ represent the center thicknesses and air spaces of the successive lenses, $n_1, n_2, n_3, \ldots$ and $\nu_1, \nu_2, \nu_3, \ldots$ represent the refractive indices and Abbe numbers, respectively, of the successive lenses.

3. The zoom lens according to claim 1, wherein said fourth group further has a biconvex lens between said forward group and said rearward group.

4. The zoom lens according to claim 3, wherein when the shape factor of the biconvex lens in said fourth group is qc, the condition that $$-0.5 < qc < 0.5$$

is satisfied.

5. The zoom lens according to claim 4, wherein when the distance between the biconvex lens in said fourth group and said forward group is $d_{20}$ and the distance between said biconvex lens and said rearward group is $d_{22}$, the condition that $$0.3 < d_{20}/d_{22} < 2.0$$

is satisfied.

6. The zoom lens according to claim 5, wherein numerical data as as follows:

| $f = 80 \sim 200$ | | F-number 2.8 | | | |
|---|---|---|---|---|---|
| $r_1 = 164.0$ | $d_1 = 2.7$ | $n_1 = 1.75520$ | $\nu_1 = 27.6$ | } $L_1$ | } |
| $r_2 = 105.11$ | $d_2 = 10.5$ | $n_2 = 1.50032$ | $\nu_2 = 82.3$ | | } $G_1$ |
| $r_3 = -425.427$ | $d_3 = 0.2$ | | | | |
| $r_4 = 160.0$ | $d_4 = 5.0$ | $n_3 = 1.50032$ | $\nu_3 = 82.3$ | $L_2$ | |
| $r_5 = 405.897$ | $d_5 =$ variable | | | | |
| $r_6 = -300.0$ | $d_6 = 1.6$ | $n_4 = 1.78797$ | $\nu_4 = 47.5$ | } $L_3$ | |
| $r_7 = 80.90$ | $d_7 = 9.0$ | $n_5 = 1.75520$ | $\nu_5 = 27.6$ | | |
| $r_8 = -66.99$ | $d_8 = 1.45$ | $n_6 = 1.58144$ | $\nu_6 = 40.8$ | | } $G_2$ |
| $r_9 = 90.0$ | $d_9 = 6.6$ | | | | |
| $r_{10} = -80.0$ | $d_{10} = 1.8$ | $n_7 = 1.58913$ | $\nu_7 = 61.2$ | $L_4$ | |
| $r_{11} = 346.871$ | $d_{11} =$ variable | | | | |
| $r_{12} = 200.0$ | $d_{12} = 7.0$ | $n_8 = 1.67025$ | $\nu_8 = 57.6$ | } $L_5$ | $G_3$ |
| $r_{13} = -65.0$ | $d_{13} = 1.45$ | $n_9 = 1.80518$ | $\nu_9 = 25.4$ | | |
| $r_{14} = -149.342$ | $d_{14} =$ variable | | | | |
| $r_{15} = 41.2$ | $d_{15} = 6.0$ | $n_{10} = 1.78797$ | $\nu_{10} = 47.5$ | $L_6$ } | |
| $r_{16} = 158.55$ | $d_{16} = 6.0$ | | | | |
| $r_{17} = -206.77$ | $d_{17} = 4.5$ | $n_{11} = 1.78797$ | $\nu_{11} = 47.5$ | $L_7$ } $G_{41}$ | |
| $r_{18} = -80.9$ | $d_{18} = 1.5$ | | | | |
| $r_{19} = -78.547$ | $d_{19} = 2.0$ | $n_{12} = 1.75520$ | $\nu_{12} = 27.6$ | $L_8$ } | |
| $r_{20} = 147.06$ | $d_{20} = 19.0$ | | | | |

-continued

| | | f = 80~200 F-number 2.8 | | |
|---|---|---|---|---|
| $r_{21} = 260.0$ | $d_{21} = 3.5$ | $n_{13} = 1.63854$ $\nu_{13} = 55.5$ | $L_9$ | $G_4$ |
| $r_{22} = -299.3$ | $d_{22} = 22.7$ | | | |
| $r_{23} = -24.38$ | $d_{23} = 3.0$ | $n_{14} = 1.7130$ $\nu_{14} = 54.0$ | $L_{10}$ | $G_{42}$ |
| $r_{24} = -48.971$ | $d_{24} = 0.2$ | | | |
| $r_{25} = 77.0$ | $d_{25} = 4.5$ | $n_{15} = 1.61293$ $\nu_{15} = 37.0$ | $L_{11}$ | |
| $r_{26} = -295.287$ | | | | |

Back focal length $B_f = 40.639$

| f | 80 | 140 | 200 |
|---|---|---|---|
| $d_5$ | 4.2245 | 51.0442 | 69.772 |
| $d_{11}$ | 50.425 | 25.6435 | 0.8618 |
| $d_{14}$ | 25.318 | 3.280 | 9.334 |

$f_4 = 114.874$
$f_{41} = 131.212$
$q_a = q_7 = -2.285$
$q_b = q_8 = 0.304$
$q_c = q_9 = 0.07$ where $r_1, r_2, r_3, \ldots$ represent the radii of curvature of the successive lens surfaces from the object side, $d_1, d_2, d_3, \ldots$ represent the center thickness and air spaces of the successive lenses, $n_1, n_2, n_3, \ldots$ and $\nu_1, \nu_2, \nu_3, \ldots$ represent the refractive indices and Abbe numbers, respectively, of the successive lenses.

7. A zoom lens having, in succession from the object side, a first lens group of positive refractive power having a focusing function, a second lens group of negative refractive power having a magnification changing function, a third lens group of positive refractive power having a correcting function for keeping the image plane at a predetermined position, and a fourth lens group of positive refractive power having an imaging function, said first to third lens groups forming a substantially afocal magnification changing portion, characterized in that said fourth lens group includes, in succession from the object side, a forward group comprising a positive meniscus lens component having its convex surface facing the object side, a positive lens component having its surface of sharper curvature of facing the image side, and a biconcave lens component, a rearward group having a negative lens component and a positive lens component, and a biconvex positive lens between said forward group and said rearward group.

8. The zoom lens according to claim 7, wherein the shape factor of the biconvex lens in said fourth group is qc, the condition that $$-0.5 < qc < 0.5$$

is satisfied.

9. The zoom lens according to claim 8, wherein when the distance between the biconvex lens in said fourth group and said forward group is $d_{20}$ and the distance between said biconvex lens and said rearward group is $d_{22}$, the condition that $$0.3 < d_{20}/d_{22} < 2.0$$

is satisfied.

* * * * *

UNITED STATES PATENT AND TRADEMARK OFFICE
CERTIFICATE OF CORRECTION

PATENT NO. : 4,468,097
DATED : August 28, 1984
INVENTOR(S) : YOSHINARI HAMANISHI It is certified that error appears in the above-identified patent and that said Letters Patent is hereby corrected as shown below:

IN THE ABSTRACT:

Line 10, change "a focal" to --afocal--;

Line 14, change "components" to --component--.

Column 1, lines 26-27, change "it has often been the case that" to --frequently--;

line 62, change "has contrived" to --contemplates--

Column 2, line 44, after "and" insert --the--;

line 50, after "and" insert --the--.

Column 3, line 18, change "having" to --have--.

Column 5, line 53, change "endorses" to --confirms--.

Column 10, line 25, after "wherein" insert --when--.

Signed and Sealed this

Eighth Day of January 1985

[SEAL]

Attest:

GERALD J. MOSSINGHOFF

*Attesting Officer*

*Commissioner of Patents and Trademarks*